United States Patent [19]

Lamke

[11] 4,221,664
[45] Sep. 9, 1980

[54] DIRECT COUPLED DRIVE FOR A MAGNETIC SEPARATOR

[75] Inventor: Arland D. Lamke, Franklin, Wis.

[73] Assignee: Magnetics International, Inc., Maple Heights, Ohio

[21] Appl. No.: 930,812

[22] Filed: Aug. 2, 1978

[51] Int. Cl.² ............................................. B07B 1/26
[52] U.S. Cl. .............................. 209/213; 209/223 R; 64/11 R
[58] Field of Search .............. 209/287, 288, 309, 219, 209/220, 224, 223 R, 270, 363, 364 R, 473, 482, 451; 64/11, 13, 11 B, 11 P, 11 F

[56] References Cited

U.S. PATENT DOCUMENTS

| | | | |
|---|---|---|---|
| 2,807,367 | 9/1957 | Symons | 209/364 X |
| 2,851,053 | 10/1958 | Schmiedel | 209/270 X |
| 2,928,544 | 3/1960 | Roubal | 209/367 |
| 2,970,694 | 2/1961 | Nyce | 209/367 |
| 2,992,738 | 7/1961 | Maynard | 209/223 R |
| 3,024,628 | 3/1962 | Yang | 64/11 R |
| 3,209,912 | 10/1965 | Sloan | 209/223 R |
| 4,077,873 | 3/1978 | McKibben | 209/363 X |

FOREIGN PATENT DOCUMENTS

| | | | |
|---|---|---|---|
| 141060 | 9/1948 | Australia | 209/287 |
| 842878 | 5/1952 | Fed. Rep. of Germany | 64/11 R |
| 663350 | 12/1951 | United Kingdom | 64/13 |
| 809867 | 3/1959 | United Kingdom | 209/270 |

*Primary Examiner*—Robert Halper
*Attorney, Agent, or Firm*—Wegner, Stellman, McCord, Wiles & Wood

[57] ABSTRACT

An annular flexible element is coupled between a motor-driven flange assembly and a drum mounted for rotation about a fixed shaft to provide a direct drive for a magnetic separator. The direct drive avoids the need for external belts, chains or gears, and the flexible element provides a seal between the flange assembly and the drum to provide contaminant-free operation during processing of ores and other materials.

1 Claim, 3 Drawing Figures

DIRECT COUPLED DRIVE FOR A MAGNETIC SEPARATOR

BACKGROUND OF THE INVENTION

This invention relates to a directly coupled machine drive for a rotatable element and, more particularly, to an improved drive for a magnetic separator.

Gravel, coal or minerals in dry form or in slurry form may be provided to a magnetic separator for removing the magnetic particles therein. The separator usually includes a drum partially immersed in the slurry and mounted for rotation about a shaft. The drum is driven by an external belt, chain, or gears from a motor, and the collected particles are removed from the drum during rotation. An example of such a separator and its principle of operation may be found in U.S. Pat. No. 3,209,912. The belt, chain or gear drives of the magnetic separators known to the prior art must be checked frequently and enclosed by an expensive protective housing in order to meet safety regulations. Moreover, contaminants such as dust and particles from the gravel, coal or minerals generated during processing can undesirably shorten the life of the belts, chains, gears or bearings.

Considering the above disadvantages, a magnetic separator is provided with a drive that requires no external belts, chains or gears, requires little maintenance, and is sealed from the dust and other particles encountered during the processing of materials.

SUMMARY OF THE INVENTION

A flexible element directly interconnects a motor-driven flange assembly with a drum mounted for rotation about a fixed shaft in a magnetic separator. The flexible element imparts torque to the drum with a minimum amount of shear or bending moment thereto. The flexible element, along with other sealing means assures contaminant-free operation.

It is an object of the present invention to provide an improved drive for a rotatable element, which drive need not necessarily have external belts, chains or gears.

Another feature of the present invention is to provide a magnetic separator with the improved drive for contaminant-free operation during the processing of ores and other materials used in magnetic separation.

Other features and advantages will become apparent when considering the specification in combination with the drawing in which:

DRAWING

DESCRIPTION OF THE PREFERRED EMBODIMENT

Figure 1:
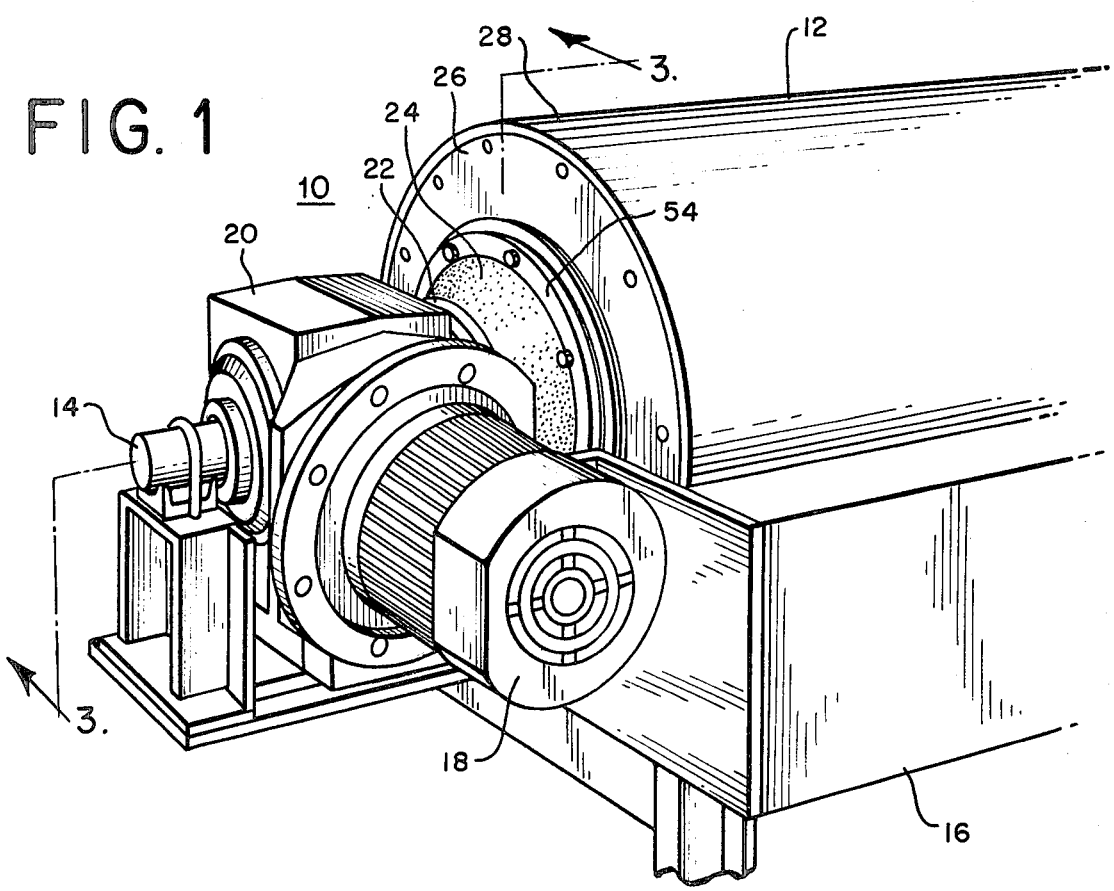
FIG. 1 is a perspective view of a magnetic separator having a directly coupled machine drive in accordance with the present invention.

Referring to FIg. 1, the magnetic separator 10 includes a drum 12 mounted for rotation about shaft 14 which is secured to frame 16 at each end. Motor 18 is mounted to a shaft-mounted reducer 20 for driving drum 12. Rotational energy from speed reducer 20 is imparted to flange assembly 22, and an annular flexible element 24 interconnects flange assembly 22 with a driven head 26 on the end of drum 12 for imparting a torque from flange assembly 22 to drum 12. The drum 12 is supported on the right end (as seen in FIG. 1) and mounted for rotation about shaft 14 at that end in any acceptable manner as, for example, by a member having a configuration similar to driven head 26.

Drum 12, or any other element constructed and arranged for rotation about shaft 14, is driven by motor 18 through speed reducer 20, flange assembly 22 and flexible element 24. The flexible element 24 may be of any elastomeric material, including rubber (synthetic or natural). The flexible element 24 permits substantially pure torque to be applied to drum 12. Only a relatively small amount of axial force can be imparted to the rotating element from the flange assembly 22, as any axial forces are relieved by the flexing of element 24. Moreover, the flexible element 24 absorbs shock and permits some misalignment of the flange assembly 22 with respect to drum 12. This advantage may be particularly useful if the flange assembly 22 is mounted on a shaft different from but coincident with a separate shaft mounting a drum (not shown).

Figure 2:
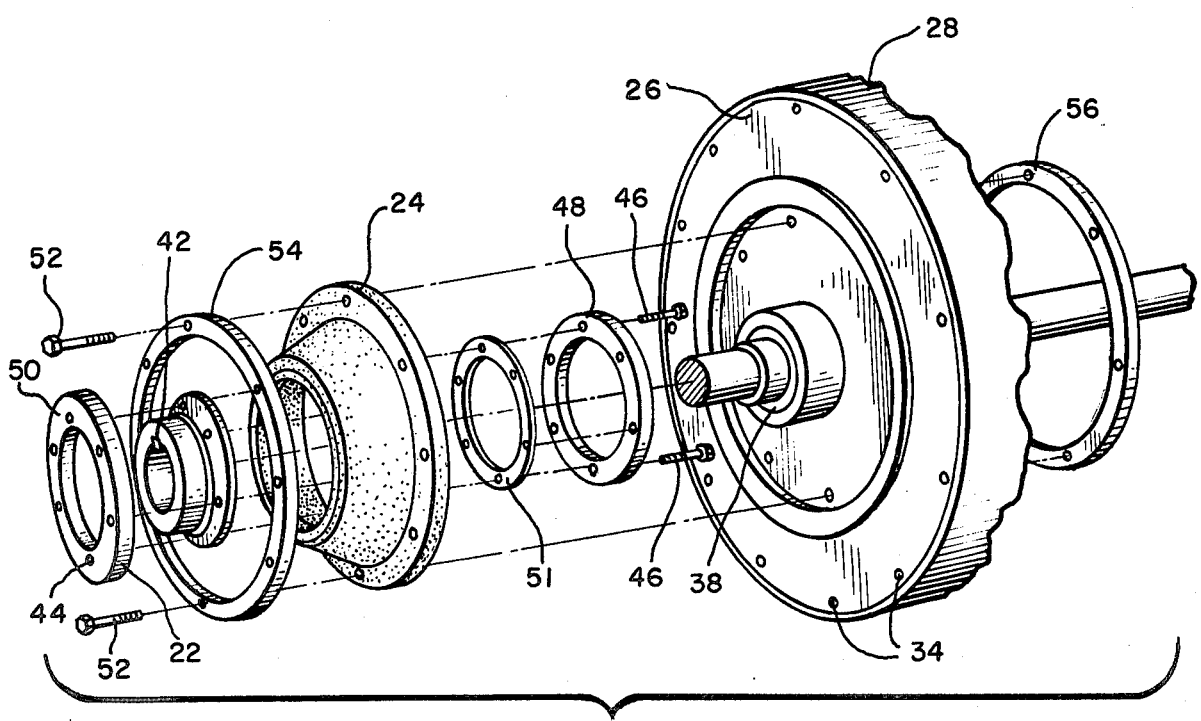
FIG. 2 is a detailed exploded perspective view of the directly coupled machine drive portion of the magnetic separator shown in FIG. 1.
Figure 3:
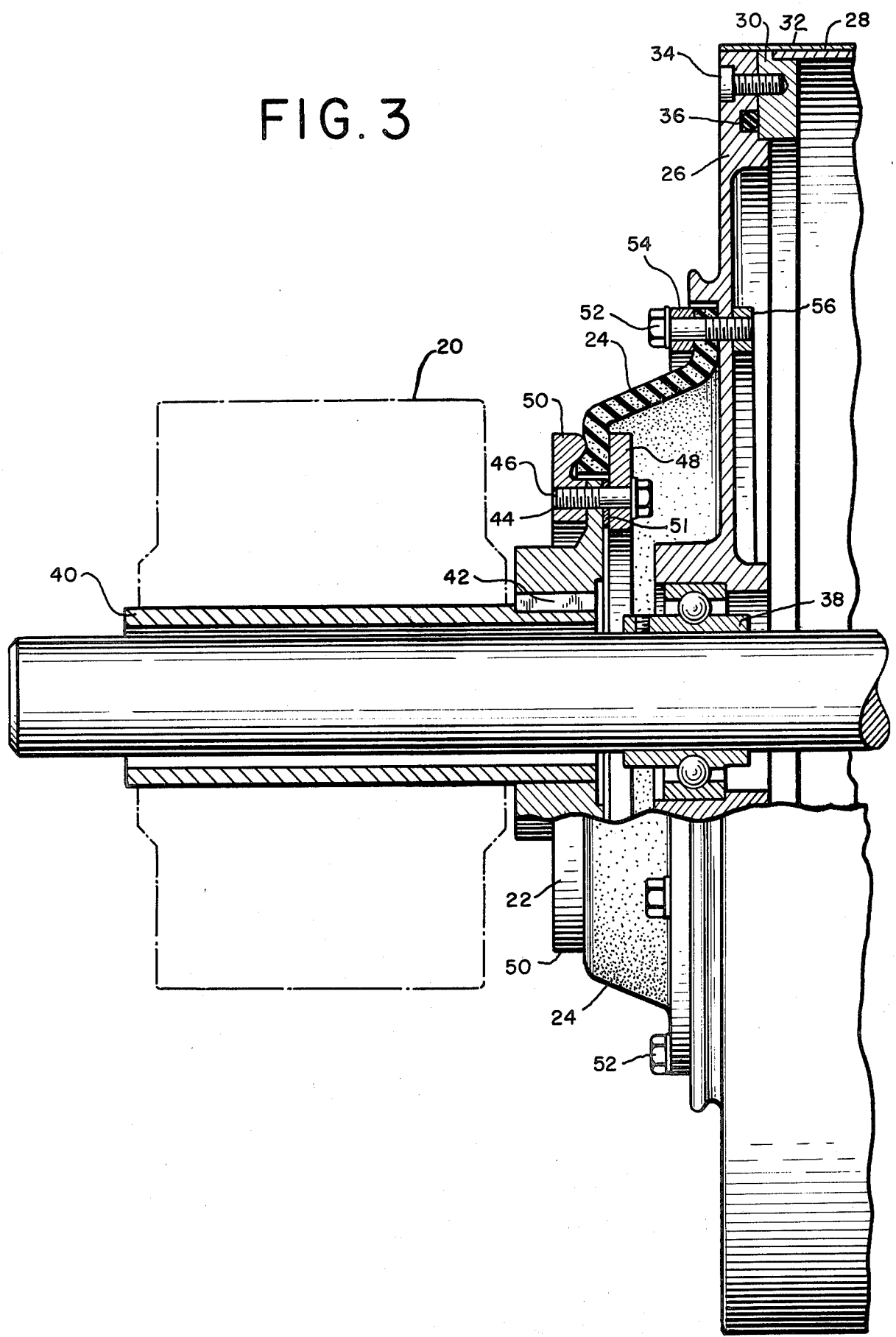
FIG. 3 is a cross-sectional view taken through the lines 3—3 in FIG. 1.

Referring to FIGS. 2 and 3, the construction of the directly coupled machine drive for drum 12 will now be explained. The drum 12 includes a cylinder 28 having a ring 30 mounted and secured to its end. The ring 30 maintains cylinder 28 round and provides a surface for mounting driven head 26. An optional wear cylinder 32 may be used to cover cylinder 28, depending upon the particular material to be used within magnetic separator 10.

Driven head 26, having a diameter substantially equal to the diameter of cylinder 28, is attached to ring 30 by a plurality of screws 34, and O-ring 36 may be employed to seal driven head 26 with ring 30 for keeping out dust, particles of ore or moisture. Bearing 38 mounts driven head 26 for rotation about shaft 14. With a similar construction at the other end of cylinder 28, drum 12 is rotatable about shaft 14.

Motor 18 applies energy to speed reducer 20. Although the speed reducer 20 and the motor 18 form no part of the present invention, they must be capable of applying rotational energy at the desired speed and required torque. Rotational energy from sleeve 40 of speed reducer 20 is imparted to flange assembly 22 by key 42.

The flange assembly 22 has a plurality of holes 44 for receiving flange bolts 46. Specifically, flange bolts 46 extend through internal clamp ring 48 and through holes 44, into external clamp ring 50, capturing flexible element 24 and a flange spacer ring 51 therebetween, if needed. The flexible element 24 is secured to the flange assembly 22 around its perimeter.

The axial length of flexible element 24 substantially depends upon the distance between flange assembly 22 and driven head 26. As seen in FIGS. 2 and 3, the radial length of flexible element 24 is greater at the driven head 26 than at the flange assembly 22.

The flexible element 24 is secured to the driven head 26 by bolts 52 extending through the plurality of holes in external bolt ring 54 and through the holes in flexible element 24, into internal bolt bar 56. The flexible element 24 is captured by the external bolt ring 54, and driven head 26 is secured around its perimeter for imparting torque thereto.

I claim:

1. In a magnetic separator having a drum, a frame, a through shaft coupled to said frame and extending through said drum, a motor for imparting rotational motion to said drum through an improved direct drive comprising:
   a sleeve concentrically disposed about a portion of said shaft for rotation relative to said shaft;
   a flexible coupling connected at one end portion to said sleeve and connected at the other end portion to said drum, said flexible coupling providing a seal against contaminants traversing from one side of said coupling to the other; and
   a prime mover mounted on said frame for imparting direct drive rotational motion to said sleeve whereby said sleeve drives said flexible coupling and said drum about said through shaft.